Nov. 27, 1956     L. H. WEBER     2,771,982
CAN BODY RESPACING MECHANISM
Filed July 29, 1953     3 Sheets-Sheet 2

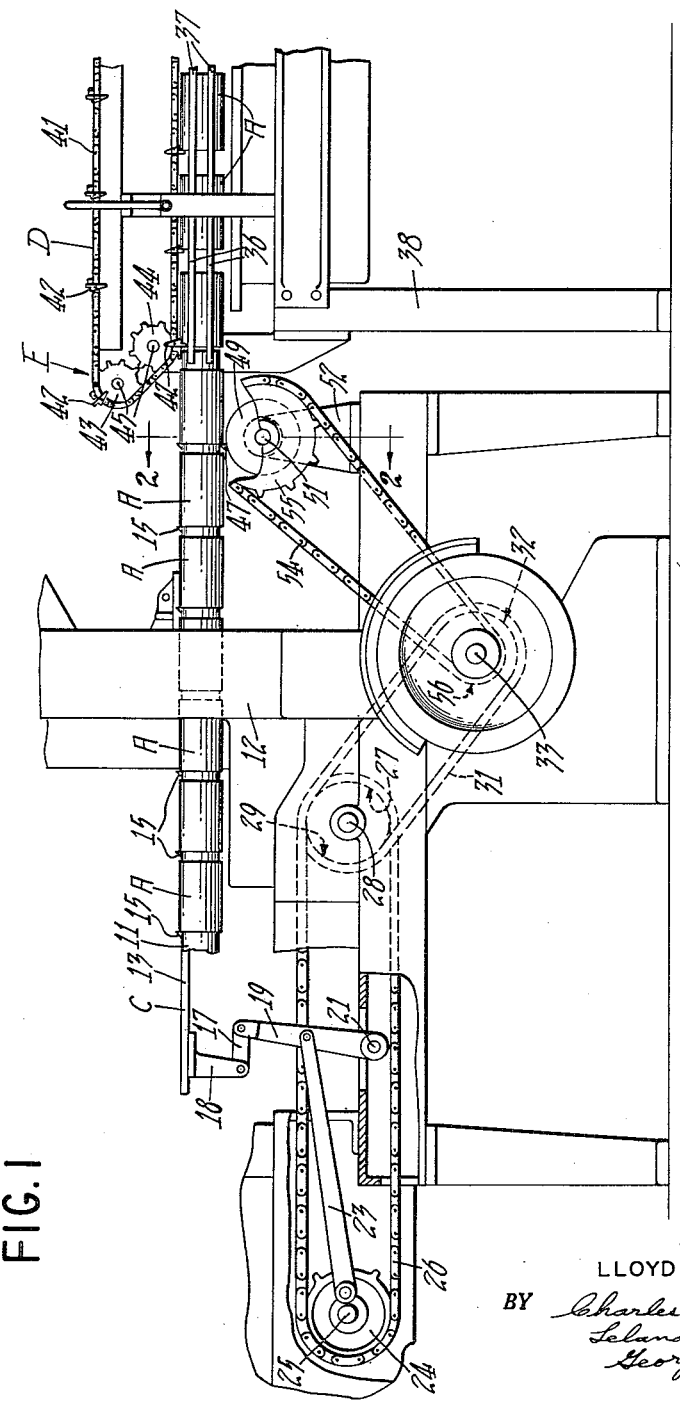

INVENTOR.
LLOYD H. WEBER
BY Charles H. Brne
Leland R. McCann
George W. Reiber
ATTORNEYS Nov. 27, 1956   L. H. WEBER   2,771,982
CAN BODY RESPACING MECHANISM
Filed July 29, 1953   3 Sheets-Sheet 3

INVENTOR.
LLOYD H. WEBER
BY Charles H. Gune
Leland R. McCann
George W. Reiber
ATTORNEYS

United States Patent Office 2,771,982
Patented Nov. 27, 1956

2,771,982

CAN BODY RESPACING MECHANISM

Lloyd H. Weber, Newark, N. J., assignor to American Can Company, New York, N. Y., a corporation of New Jersey Application July 29, 1953, Serial No. 370,978

7 Claims. (Cl. 198—34)

The present invention relates to machines for making sheet metal can bodies in which the bodies are propelled in timed and spaced order along a predetermined path of travel and has particular reference to devices for respacing the moving bodies for subsequent operations without disturbing their timed relation.

In the manufacture of sheet metal can bodies, certain machines, such as bodymakers with side seam soldering attachments, are utilized without change to produce can bodies of the same diameter but of various lengths or heights within a predetermined range. The longest or tallest body the machine will produce is governed by the minimum space required between bodies to properly propel them through the machine. This space in turn is determined by the feeding mechanism of the soldering attachment, which mechanism is provided with gripper fingers that require sufficient space between bodies to enter within the bodies to hold them tight during the soldering operation. This space is considerably greater than that needed for the usual feed dogs utilized in the preceding bodymaker to propel the bodies.

In order to increase the range of bodies which can be produced on such a machine, the instant invention provides for producing the greatest length or height of body that can be accommodated in the bodymaker and further provides for increasing the space between the bodies immediately prior to their transfer to the soldering attachment so as to facilitate gripping of the bodies for advancement therethrough.

An object of the invention is the provision in such a machine, of devices which operate to increase the space between can bodies moving in a procession, without altering the timed relation of the bodies, so that increased length or height bodies may be produced and properly gripped for a subsequent operation without changing the machine to accommodate longer bodies and without interrupting the processional order of the bodies.

Numerous other objects and advantages of the invention will be apparent as it is better understood from the following description, which, taken in connection with the accompanying drawings, discloses a preferred embodiment thereof.

Referring to the drawings:

Figure 1 is a side elevation showing principal parts of a can body making machine embodying the instant invention and also the initial portion of a side seam soldering attachment, with parts broken away and a procession of can bodies passing through the machine;

Figure 3:
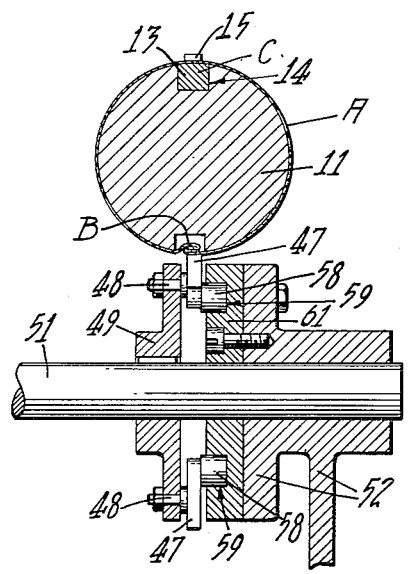
Fig. 3 is an enlarged sectional view of certain of the parts shown in Fig. 1.

As a preferred or exemplary embodiment of the instant invention the drawings illustrate principal parts of a can body making and soldering machine in which cylindrical sheet metal can bodies A (Fig. 1) are formed, preferably from flat blanks having edges locked in side seams B (Fig. 3). The bodies are advanced in timed and spaced processional order by a delivery mechanism or conveyor C to a receiving mechanism or conveyor D of a soldering attachment in which the locked side seams B are soldered. The can body making machine preferably is of the character disclosed in United States Patent 1,770,041, issued July 8, 1930, to John F. Peters on Roll Bodymaker. The soldering attachment is of the character disclosed in United States Patent 1,338,716, issued May 4, 1920, to M. E. Widell on Soldering Machine.

In such a can body making and soldering machine, the can bodies A are formed with side seams B and prepared for soldering during advancement in spaced and timed order along an inside mandrel or horn 11 (Fig. 1) supported in a frame 12 which constitutes the main frame of the machine. Advancement of the bodies along the horn 11 is effected in an intermittent or step-by-step manner, preferably by a reciprocating feed bar 13 disposed in a longitudinal groove 14 in the mandrel 11 (see Fig. 3). The feed bar 13 is provided with spaced, spring pressed, retractable feed dogs 15 for propelling engagement behind the can bodies. This feed bar 13 and its feed dogs 15 constitute the delivery mechanism C which advances the can bodies in spaced and timed order and delivers them to the receiving mechanism D.

Reciprocation of the feed bar 13 is effected by a link 17 (Fig. 1) having one end pivotally connected to a lug 18 which depends from the feed bar and having its opposite end pivotally connected to a rocker arm 19 mounted on a pivot pin 21 carried in the machine frame 12. The arm is rocked on its pivot pin 21 by a connecting rod 23 one end of which is pivotally connected to the arm. The opposite end of the connecting rod 23 is pivotally and eccentrically connected to a sprocket 24 mounted on a cross-shaft 25 journaled in suitable bearings in the machine frame 12.

Figure 2:
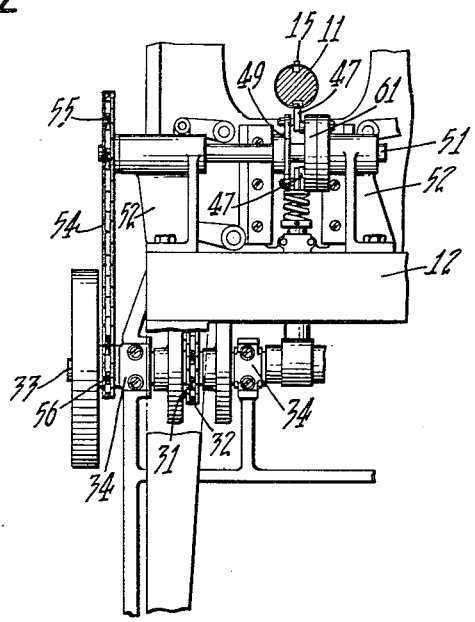
Fig. 2 is a transverse sectional view taken substantially along the line 2—2 in Fig. 1, with parts broken away.

Rotation of the sprocket 24 is effected by an endless chain 26 which operates over the sprocket and over an idler sprocket 27 mounted on a shaft 28 journaled in suitable bearings in the machine frame 12. The idler sprocket 27 is rotated by a second sprocket 29 mounted on the shaft 28 adjacent the sprocket 27 and rotated by an endless chain 31 which is driven by a driving sprocket 32 (see also Fig. 2) mounted on a main drive shaft 33 journaled in bearings 34 in the machine frame 12. The driving shaft 33 may be rotated in any suitable manner.

At a transfer station E (Fig. 1), the inside forming mandrel 11 terminates and slightly overlaps the receiving or entrance end of an outside horse 36 which is part of the soldering attachment of the machine. This horse 36 comprises a plurality of spaced guide bars 37 which surround the can bodies and provide for continued guidance of the bodies for the soldering operation. These horse bars 37 are supported in a subframe 38.

The can bodies A are propelled through the outside horse 36 by a continuously moving endless chain conveyor 41 having gripper dogs 42 spaced at intervals along the chain and which travel along the top of the horse. The chain conveyor 41 and its gripper dogs 42 constitute the receiving mechanism D. This receiving mechanism D is partially coextensive with and thus slightly overlaps the delivery feed mechanism C and picks up the can bodies at the transfer station E and propels them through the soldering attachment.

At the receiving end of the horse 36 the conveyor 41 operates over a pair of vertically spaced idler sprockets 43, 44 mounted on shafts 45 journaled in suitable bearings in the subframe 38. The conveyor 41 is continuously operated in any suitable manner, preferably by a synchronous connection with the bodymaker as disclosed in the above mentioned Widell patent, so that the conveyor operates in timed relation with the feed bar 13 of the bodymaker.

In such an organized apparatus where various forming operations are required to be performed in sequence at stations through which the can bodies are passed intermittently, the operation of the machine is facilitated by having the advancing bodies spaced apart equally. In the instant machine the reciprocating feed bar 13, having a fixed stroke and having its feed dogs 15 equally spaced apart, controls the spaced intermittent advancement of the can bodies A through the bodymaker for delivery to the soldering attachment. The space between the feed dogs 15 is fixed and is selected to accommodate the longest can body required to be produced on the machine. The longest can body may occupy nearly all the space between the feed dogs, leaving only a minimum space K (see Fig. 4) of, for example, one quarter of an inch between it and the next adjacent body to permit a feed dog 15 to engage against the following edge of the body to propel it along the mandrel 11. Thus long bodies as well as short bodies of the same diameter may be produced in the machine and advanced along the mandrel 11 without changing the stroke of the feed bar 13.

The minimum space K between long bodies, however, is not sufficient to permit the gripper dogs 42 of the receiving mechanism D to enter between the bodies and properly grip them for the soldering operation as they do with short bodies. To overcome this difficulty provision is made to advance each can body A a predetermined distance as it approaches the transfer station E, to increase the space between its following edge and the leading edge of the following can body in the procession. The space is increased to a maximum space L (Fig. 5) of, for example, five eights of an inch as compared with the minimum quarter inch space K hereinbefore mentioned.

The respacing of the can body A as it approaches the transfer station E is effected immediately following the feeding or forward stroke of the feed bar 13 and while the feed bar is moving back on its return stroke. This extra advancement of the body is brought about by a rotatable respacing finger 47 which is disposed near the transfer station E and adjacent the path of travel of the can bodies moving along the mandrel 11. There are two respacing fingers 47 mounted on pivot pins 48 (Figs. 2 and 3) secured in diametrically opposed relation in a disc 49 carried on a horizontal shaft 51 extending transversely of the machine immediately below the mandrel 11 for engaging behind the can bodies individually.

The shaft 51 is journaled in a pair of spaced bearing brackets 52 carried on the main frame 12 and is rotated continuously in time with the other moving parts of the machine and especially in time with the feed bar 13. Rotation of the shaft 51 is effected by an endless chain 54 (Figs. 1 and 2) which operates over a sprocket 55 on the shaft and a sprocket 56 on the main driving shaft 33.

The respacing fingers 47, intermediate their ends, carry cam rollers 58 (Figs. 2, 4 and 5) which operate in a cam groove 59 of a stationary face cam 61 disposed adjacent the disc 49 in spaced relation thereto and secured to the adjacent bearing bracket 52.

Hence as the disc shaft 51 rotates in time with the reciprocation of the feed bar 13, it rotates the disc 49 and thus carries the respacing fingers 47 around with it in a circular path of travel under the mandrel 11. This travel of the fingers 47 causes the cam rollers 58 to traverse the cam groove 59. During one half of a revolution of the disc 49 one of the respacing fingers 47 moves up toward the mandrel 11 and engages behind the following edge of a can body 11 just as it reaches the position shown in Fig. 4. This is the position the can body is in when the feed bar 13 has completed its feeding stroke and starts to move back for a repeat feeding stroke.

During the return stroke of the feed bar 13, the respacing finger 47 moves forward substantially in a straight line along the under side of and parallel with the mandrel 11 and thus pushes the can body forward or advances it the extra distance to create the wide space L between this body and the next following body which remains at rest during this operation. The straight line movement of the respacing finger 47 is effected by the shape of the cam groove 59 at this place. The shape of the cam groove 59 also provides for a sudden or abrupt drop of the respacing finger 47 at the completion of the can body spacing operation so that the finger is rapidly and abruptly removed from engagement with the body when the proper space L (Fig. 5) is created.

In order to maintain this increased space L between the advanced body and the next following body during transfer of the advanced body into proper position adjacent the soldering attachment conveyor 41, the reciprocating feed bar 13 is provided with a spring pressed, retractable, auxiliary feed dog 64 (Figs. 4 and 5) which preferably is the last feed dog on the feed bar. This feed dog 64 is similar to the feed dogs 15 but is spaced relative to the next preceding feed dog 15 a greater distance sufficient to compensate for the increased space L between bodies. Hence this feed dog 64 upon movement of the feed bar 13 moves through the same distance as the feed dogs 15 but is always in advance of the preceding dog 15 by a distance which compensates for the increased space L between bodies.

Figure 4:
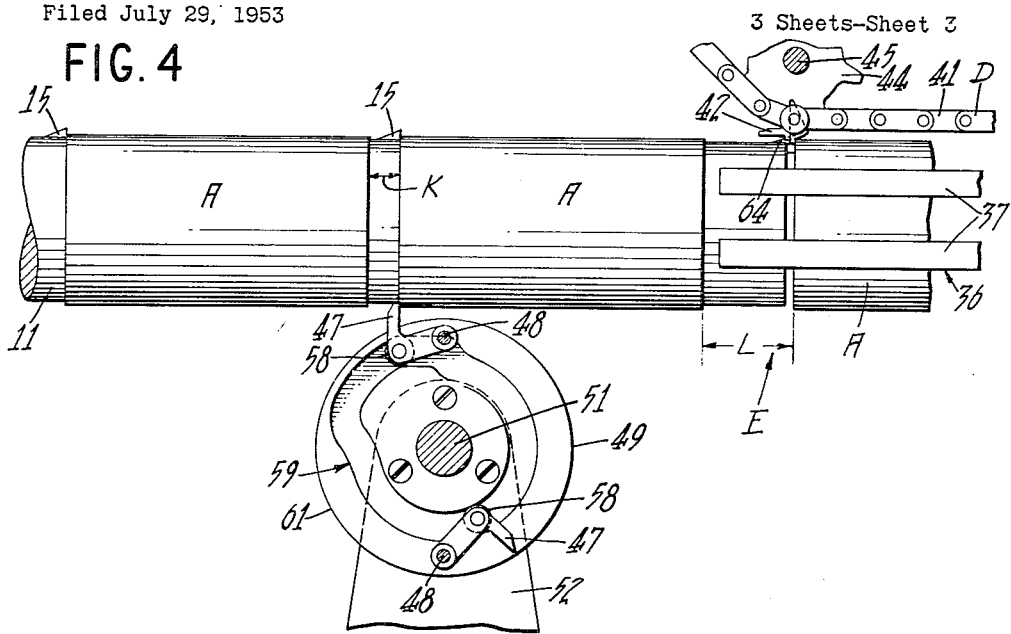
Figs. 4 and 5 are enlarged schematic views of principal parts of the machine shown in Fig. 1 and showing how the space between can bodies in the procession is increased, the views showing the parts in different positions.
Figure 5:
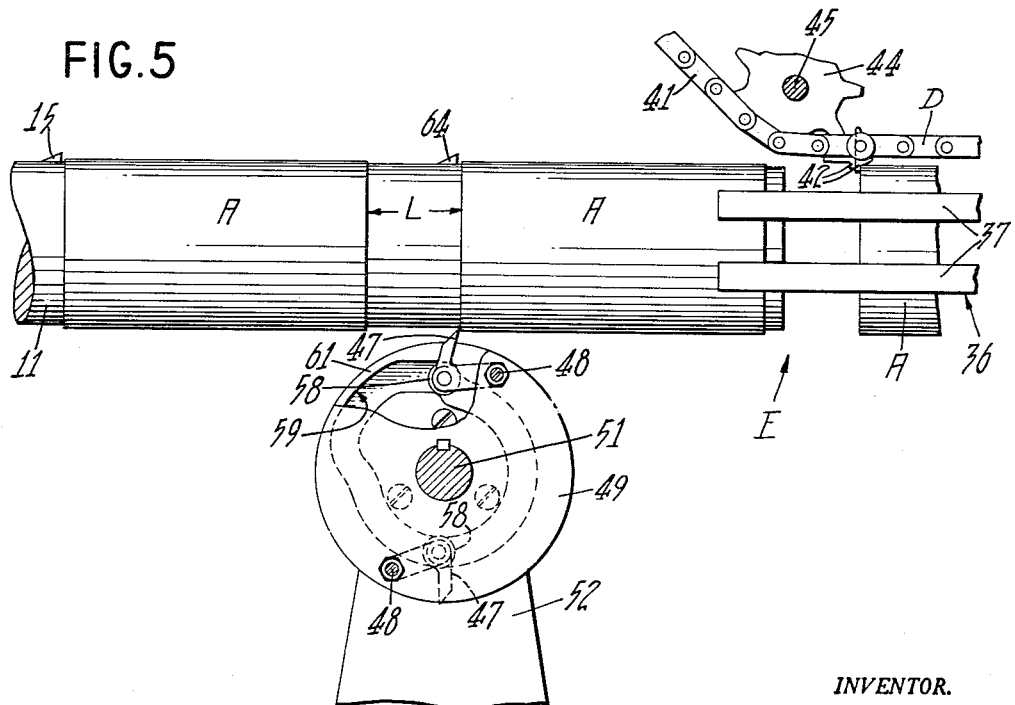

Thus upon a return stroke of the feed bar 13 (toward the left as viewed in Fig. 4) the feed dog 64 is carried back a distance sufficient to snap up in back of the advanced or respaced body A as shown in Fig. 5 while the next preceding feed dog 15, although carried back the same distance, snaps up in back of the next preceding regular spaced body A as shown in Fig. 5. Upon the forward stroke of the feed bar 13 (toward the right as viewed in Fig. 5) the feed dog 64 advances the respaced body A into position adjacent the receiving mechanism conveyor 41 as shown in Fig. 4 with the space L between it and the next preceding body providing sufficient space to permit the gripper dogs 42 to move through the space and into the positioned can body to properly grip it in the usual manner for further advancement through the outside horse 36.

During this same feeding stroke of the feed bar 13, the feed dog 15 immediately preceding the feed dog 64, advances its body A one step into the position of the body adjacent the respacing finger 47 as viewed in Fig. 4 for engagement by the finger for respacing of this can body as explained above. The timing of these operations, however, is such that the space L once created between a can body A and the next preceding body is always held constant during transfer into and advancement along the outside horse 36 so that the gripper dogs 42 have sufficient space to be removed from the bodies at the termination of their travel along the horse, as well as having sufficient space to enter between and grip the bodies at the beginning of this travel.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making can bodies, the combination of a delivery conveyor for propelling a plurality of tubular can bodies in processional order while lying on their sides and in spaced end to end relation along a fixed support defining a predetermined path of travel, a receiving conveyor disposed in overlapping relation to said delivery conveyor for receiving and further advancing said can bodies, and rotatable means disposed adjacent the path of travel of said can bodies and adjacent the terminal end of said delivery conveyor for engaging behind and increasing the space between adjacent can bodies to facilitate reception of said can bodies by said receiving conveyor.

2. In a machine for making can bodies, the combination of a delivery conveyor for propelling a plurality of tubular can bodies in processional order while supported on their sides and in spaced end to end relation along a fixed support defining a predetermined path of travel, a receiving conveyor disposed in overlapping relation to said delivery conveyor for receiving and further advancing said can bodies, a respacing finger rotatable in the plane of the path of travel of said can bodies adjacent the terminal end of said delivery conveyor, and means for rotating said respacing finger in timed relation to the advancement of said can bodies for engaging said can bodies individually to increase the space between them for facilitating the reception of said can bodies by said receiving conveyor.

3. In a machine for making can bodies, the combination of a delivery conveyor for propelling a plurality of tubular can bodies in processional order while lying on their sides and in spaced end to end relation along a fixed support defining a predetermined path of travel, a receiving conveyor disposed in overlapping relation to said delivery conveyor for receiving and further advancing said can bodies, a rotatable disc disposed adjacent the path of travel of said can bodies and adjacent the terminal end of said delivery conveyor, means for rotating said disc in the plane of the path of travel of said can bodies and in time with their advancement, and a rotatable respacing finger mounted on said disc and engageable with said can bodies individually for increasing the space between them to facilitate reception of said can bodies by said receiving conveyor.

4. In a machine for making can bodies, the combination of a delivery feed conveyor for propelling a plurality of tubular can bodies in processional order while supported on their sides and in spaced end to end relation along a fixed support defining a predetermined path of travel, a receiving feed conveyor disposed in overlapping relation to said delivery feed conveyor for receiving and further advancing said can bodies, a rotatable disc disposed adjacent the path of travel of said can bodies and adjacent the terminal end of said delivery feed conveyor, means for rotating said disc in the plane of the path of travel of said can bodies and in time with their advancement, and a plurality of rotatable respacing fingers mounted on said disc in circumferentially spaced relation, said fingers being successively engageable behind said can bodies individually for increasing the space between them to facilitate reception of said can bodies by said receiving feed conveyor.

5. In a machine for making can bodies, the combination of a delivery feed conveyor for propelling a plurality of tubular can bodies in processional order while lying on their sides and in spaced end to end relation along a fixed support defining a predetermined path of travel, a receiving feed conveyor disposed in overlapping relation to said delivery feed conveyor for receiving and further advancing said can bodies, a rotatable disc disposed adjacent the path of travel of said can bodies and adjacent the terminal end of said delivery feed conveyor, means for rotating said disc in the plane of the path of travel of said can bodies and in time with their advancement, a can body respacing finger pivotally mounted on said disc, and means for pivotally moving said finger on and relative to said disc to propel said finger along a path parallel to and adjacent the path of travel of said can bodies to advance said can bodies individually along said path of travel for increasing the space between them so as to facilitate successive reception of said can bodies by said receiving feed conveyor.

6. In a machine for making can bodies, the combination of a delivery feed conveyor for propelling a plurality of tubular can bodies in processional order while supported on their sides and in spaced relation along a fixed support defining a predetermined path of travel, a receiving feed conveyor disposed in overlapping relation to said delivery feed conveyor for receiving and further advancing said can bodies, a rotatable disc disposed adjacent the path of travel of said can bodies and adjacent the terminal end of said delivery feed conveyor, means for rotating said disc in the plane of the path of travel of said bodies and in time with their advancement, a can body respacing finger pivotally mounted on said disc, and cam actuated means for pivotally moving said finger on and relative to said disc to propel said finger along a path parallel to and adjacent the path of travel of said can bodies for advancing said bodies individually along said path of travel to increase the space between them, and cam actuated means being further operative to abruptly withdraw said finger from said path of can body travel to locate a respaced can body in a predetermined spaced position relative to a succeeding can body.

7. In a machine for making can bodies, the combination of a mandrel, a delivery feed mechanism including a reciprocatable feed bar having equally spaced feed dogs extending along said mandrel, means for reciprocating said feed bar through a feeding stroke and a return stroke for propelling can bodies along said mandrel in spaced and timed processional order and for delivering the bodies to a transfer station, an outside horse disposed in overlapping relation to said mandrel, a continuously operating receiving feed mechanism disposed adjacent said outside horse and including a conveyor having spaced gripper dogs for gripping said can bodies at said transfer station for further advancement, means disposed adjacent said transfer station for engaging can bodies individually on said mandrel for increasing the space between adjacent can bodies to facilitate entrance of said gripper dogs into said respaced bodies for advancement along said outside horse, and an auxiliary feed dog on said feed bar adjacent its terminal end spaced from a preceding feed dog a greater distance than the distance between said equally spaced feed dogs.

References Cited in the file of this patent

UNITED STATES PATENTS

| | | |
|---|---|---|
| 776,330 | Johnson | Nov. 29, 1904 |
| 1,242,738 | Taliaferro | Oct. 9, 1917 |
| 1,924,146 | Almgren | Aug. 29, 1933 |
| 2,530,412 | Wallace | Nov. 21, 1950 |